United States Patent
Crookes et al.

(10) Patent No.: US 8,345,677 B2
(45) Date of Patent: Jan. 1, 2013

(54) DIGITAL PROGRAM MAPPING

(76) Inventors: Brian Crookes, Toronto (CA); Karl Stoll, Pickering (CA)

( * ) Notice: Subject to any disclaimer, the term of this patent is extended or adjusted under 35 U.S.C. 154(b) by 2123 days.

(21) Appl. No.: 11/127,954

(22) Filed: May 12, 2005

(65) Prior Publication Data

US 2006/0291460 A1    Dec. 28, 2006

(51) Int. Cl.
H04L 12/28 (2006.01)
(52) U.S. Cl. ............ 370/389; 370/412; 725/32; 725/35; 725/94
(58) Field of Classification Search .................. 370/389, 370/412, 535, 537; 725/94, 95
See application file for complete search history.

(56) References Cited

U.S. PATENT DOCUMENTS

| | | | | |
|---|---|---|---|---|
| 5,652,615 A * | 7/1997 | Bryant et al. | .................... | 725/35 |
| 5,917,830 A * | 6/1999 | Chen et al. | .................... | 370/487 |
| 6,215,530 B1 * | 4/2001 | Wasilewski | .................... | 348/731 |
| 6,233,255 B1 * | 5/2001 | Kato et al. | .................... | 370/486 |
| 6,351,474 B1 * | 2/2002 | Robinett et al. | ............. | 370/486 |
| 6,421,359 B1 * | 7/2002 | Bennett et al. | ................. | 370/538 |
| 6,463,207 B1 * | 10/2002 | Abecassis | ....................... | 386/70 |
| 6,505,347 B1 * | 1/2003 | Kaneko et al. | .................. | 725/39 |
| 6,584,153 B1 * | 6/2003 | Comito et al. | ........... | 375/240.13 |
| 6,598,229 B2 * | 7/2003 | Smyth et al. | ................... | 725/107 |
| 6,611,537 B1 * | 8/2003 | Edens et al. | ................... | 370/503 |
| 6,718,552 B1 * | 4/2004 | Goode | ............................. | 725/95 |
| 6,754,905 B2 * | 6/2004 | Gordon et al. | .................. | 725/38 |
| 6,775,257 B1 * | 8/2004 | Watanabe | ..................... | 370/335 |
| 6,807,191 B2 * | 10/2004 | Fujii et al. | ..................... | 370/464 |
| 6,807,676 B1 * | 10/2004 | Robbins et al. | .................. | 725/39 |
| 6,970,564 B1 * | 11/2005 | Kubota et al. | .................. | 380/210 |
| 6,993,782 B1 * | 1/2006 | Newberry et al. | .............. | 725/39 |
| 7,113,484 B1 * | 9/2006 | Chapman et al. | ............. | 370/252 |
| 7,113,523 B1 * | 9/2006 | Kubota et al. | .................. | 370/535 |
| 7,127,619 B2 * | 10/2006 | Unger et al. | ................... | 713/193 |
| 7,191,461 B1 * | 3/2007 | Arsenault et al. | ............... | 725/54 |
| 7,260,147 B2 * | 8/2007 | Gordon et al. | ........... | 375/240.13 |
| 7,292,691 B2 * | 11/2007 | Candelore et al. | ............ | 380/212 |
| 7,349,395 B2 * | 3/2008 | Liu et al. | ........................ | 370/392 |
| 7,409,702 B2 * | 8/2008 | Cao | ............................... | 725/110 |
| 7,496,198 B2 * | 2/2009 | Pinder et al. | ................... | 380/216 |

(Continued)

FOREIGN PATENT DOCUMENTS

WO    WO 03/090401 A    10/2003

OTHER PUBLICATIONS

Bungum O W: "Transmultiplexing, transcontrol and transscrambling of MPEG-2/DVB signal" Broadcasting Convention, Int'l (Conf. Publ. No. 428) Amsterdam, Neth Sep. 12, 1996 pp. 288-293.

(Continued)

*Primary Examiner* — Dang Ton
*Assistant Examiner* — Brian O Connor
(74) *Attorney, Agent, or Firm* — Tarolli, Sundheim, Covell & Tummino LLP (57) ABSTRACT

Rather than utilizing fixed point-to-point remapping of PIDS, the present invention utilizes the type of stream that the PIDS are associated with and the related program services IDs to specify the associations between input and output programs. This permits mapping at the program level and, therefore, allows dynamic responses to input program changes based upon the program mapping references. Resolving PID mapping based upon programs and the included services allows output PIDs to remain constant service-by-service even as the input programs change.

21 Claims, 11 Drawing Sheets

U.S. PATENT DOCUMENTS

| | | | |
|---|---|---|---|
| 7,532,627 B2 * | 5/2009 | Chapman et al. | 370/395.41 |
| 7,675,901 B2 * | 3/2010 | Wang et al. | 370/352 |
| 7,730,515 B1 * | 6/2010 | MacCormack et al. | 725/139 |
| 7,751,338 B2 * | 7/2010 | Azenko et al. | 370/252 |
| 7,765,567 B2 * | 7/2010 | Candelore et al. | 725/32 |
| 7,882,517 B2 * | 2/2011 | Candelore et al. | 725/32 |
| 7,971,220 B2 * | 6/2011 | Grenier et al. | 725/70 |
| 7,992,167 B2 * | 8/2011 | Candelore et al. | 725/32 |
| 2002/0097678 A1 * | 7/2002 | Bisher et al. | 370/232 |
| 2002/0168178 A1 * | 11/2002 | Rodriguez et al. | 386/92 |
| 2004/0181800 A1 * | 9/2004 | Rakib et al. | 725/25 |
| 2004/0181811 A1 * | 9/2004 | Rakib | 725/122 |
| 2005/0102702 A1 * | 5/2005 | Candelore et al. | 725/100 |
| 2006/0002294 A1 * | 1/2006 | Chapman et al. | 370/229 |
| 2006/0039380 A1 * | 2/2006 | Cloonan et al. | 370/395.4 |
| 2006/0126505 A1 * | 6/2006 | Denney et al. | 370/229 |

OTHER PUBLICATIONS

Hall R: "Testing operational digital TV systems" Broadcasting Conventi (Publ. 447) Amsterdam, Neth Sep. 12, 1997 pp. 514-518.

Ramaswamy A et al: "design of an efficient DVB/MPEG transport stream remultiplexor" Circuits and Systems, 2000 Aug. 11, 2000 Piscataway, NJ pp. 754-757.

Birch C H: "MPEG splicing and bandwidth management" Broadcasting Convention (Publ. 447) Amsterdam Neth Sep. 12, 1997 pp. 541-546.

* cited by examiner

DIGITAL PROGRAM MAPPING

TECHNICAL FIELD

The present invention relates to streams in a communications system and, more specifically to program manipulation through editing of elementary services and associated tables.

BACKGROUND OF THE INVENTION

Mixing services within MPEG/DVB transports streams for distribution within the digital tier requires editing of elementary services and associated tables. Downstream equipment is not always interoperable and may expect a very specific assignment of packet IDs (PIDs) and program numbers further complicating the editing process. Traditional solutions apply point-to-point mapping of PIDs for each installation. The input programs and elementary service PIDS are mapped to output PIDs and programs. Any subsequent change on the input side such as a change in the program or referenced elementary services is not necessarily reflected on the output side. Therefore, PID point-to-point remapping unfortunately inhibits several features dependent on dynamic transport changes such as re-tuning, channel changing, service replacement (S/R), and automatic mapping of elementary services as they are added.

Existing remapping controls provide for only manual mapping modifications in the event of, for example, a channel change, selection of a different transport, or when new services are to be added to a program. Manual updates such as channel changes by installers require some knowledge of the transport change and, therefore, the opportunity for installer error is significant for installation change. This is because PID reassignments are specified on an individual basis and every such change must be entered manually. Therefore, burdensome operator invention is often necessary with manual point-to-point remapping which is undesirable. As a further example, Service Replacement (S/R) is an independent control mechanism that was developed as a means of temporarily switching baseband content at downlink sites. The channel number change as a result of the S/R is not presented to the end user during the switch to alternate programming. In the case of S/R for which any service interruption carries negative consequences, manual intervention is more than undesirable, it is unacceptable from a service provider's point of view.

What is needed is a means to permit routing and editing in a more dynamic environment such that downstream equipment receives the expected table references and services without interruption, despite for example the content of the services having changed, which should occur unbeknownst to the downstream equipment.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is implemented by one or more multi-decrypt receivers such as a D9828 PowerVu Multi-Decrypt Receiver made by Scientific-Atlanta, Inc. of Lawrenceville, Ga., USA, which emphasizes multiple program control in order to improve automated adjustments based on MPEG program specific information (PSI) tables. Rather than utilizing fixed point-to-point remapping of PIDS, the present invention utilizes the type of stream that the PIDS are associated with and the related program services IDs to specify the associations between input and output programs. This permits mapping at the program level and, therefore, allows dynamic responses to input program changes based upon the program mapping references. Resolving PID mapping based upon programs and the included services allows output PIDs to remain constant service-by-service even as the input programs change. Also, this permits automatic routing of services which may have been added later than installation. Therefore, simplified mapping based upon service type enable PID mapping to be resolved on program changes resulting in simpler program setup for the installer.

Digital program mapping (DPM) provides a method for grooming services into digital headends by taking advantage of elementary stream and program references to connect input services to specified output mapping. This allows indefinite input program changes without further installation requirements to update the output mapping. DPM is implemented through the use of program directed controls or primary command modes/selectors may have at least the following command elements: Drop, Pass, and Map, in order to provide grooming functions on a program basis. Additional command elements may be added. When implemented through a multi-decrypt receiver, DPM supports remapping of service replacement, channel changes including force tunes and disaster recovery. This applies equally whether a switch to another transport is involved or if the specific change occurs within the presently selected transport.

DPM typically applies to manipulation of service within a single transport stream on a multi-decrypt receiver. However, DPM can also be extended to manipulation of services following a transition to another transport stream on another multi-decrypt receiver. Moreover, DPM can be extended to manipulation of selected services on a device multiplexing two or more transport stream on a multi-decrypt receiver adapted to receive two or more transport streams and to select programs between the multiple transport stream for decryption and remapping.

A program may not be selected for DPM processing unless it has been assigned a program entry (PE). The number of available PEs depends on a specific implementation. In some cases, the same program may be assigned to multiple PE's. Also, several different programs may be created from a single input program's content. There are two types of PEs: secure program entries (SPEs) and local program entries (LPEs). SPEs are program entries associated with security elements. Only SPEs support conditional access functions. LPEs are program entries independent of security elements. No conditional access capability is associated with an LPE.

DPM modes are associated with PEs. A program is assigned to the PE and the DPM mode is associated with the program as long as the program occupies the PE. Prior to allocation of any PEs, all programs are considered to be in the unreferenced content of the transport stream. As programs are assigned to PEs for filtering, they are removed from the unreferenced portion of the transport stream. If so enabled, DPM may permit all programs and elementary services within the unreferenced content to appear at the output without further operator intervention. Unreferenced content is not merely a collection of unwanted PIDs. The unreferenced content allows two or more multi-decrypt receivers to be concatenated with one another. Decryption may take place in two or more devices while retaining integrity of the processed transport stream. Therefore, the unreferenced content provides the flexibility of not being limited to any particular number of multi-decrypt receivers.

In DPM, the Drop control allows an entire program including all of its elementary streams to be dropped from the transport. Alternatively, less than all of the elementary streams may be dropped. For example, only a single elementary stream may be dropped. Also, if other filtered programs require the dropped material, then only the references may be adjusted rather than completely dropping the elementary streams from the transport stream. DPM supports both explicit and implicit dropping of content. Explicit dropping is one in which the PE is configured with the Drop control is applied to a specific elementary stream within a program. Implicit Drop occurs when a source elementary stream is added to the incoming program and a matching MAP control has not been preconfigured for this elementary stream.

The Pass control passes the program and elementary streams without altering table or PID references unless the installer has applied the Drop control to elementary streams within the program entry. Any elementary stream added by the uplink will typically pass through without modification to the output and the output PSI/service information (SI) references are updated as appropriate to include the new streams. Similarly, changes in the incoming program references and/or elementary streams assigned to the PE are passed to the output and downstream devices.

The MAP control provides a solution based on PID remap and another in which PSI tables are modified without changing service PIDs. Input PIDs are stamped to installer selected output PIDS. Despite the particular PIDs for the elementary streams set up by the installer, the output mapping is maintained even as the input subsequently changes. Therefore, the MAP control freezes the output PIDs and programs for the benefit of the downstream devices. A variety of controls are provided to enable user initiated synchronization of the input to the output PIDs. Both manual selection of output service PIDs and automated synchronization are possible.

DPM permits the same source elementary stream to be used for multiple DPM transforms and provides for reconciliation of conflicts. Direct collisions arising from multiple references to the same PID for different services may not be mitigated because these are most often a result of direct or indirect user configuration. For example, specifying an audio service and a video service on the output side with the same packet ID produces an explicit collision that DPM will not permit.

However, when input elementary streams are used with multiple different output controls on multiple program entries, a conflict resolution hierarchy must be employed to determine which control has priority over the others. Resolution of conflicts may involve invalidating a PE's output, invalidating use of one or more single elementary streams within the PE, dropping one or more single ES, dropping a program, selection of a lead PE's output for use by a dependant PE, and enforcing DPM conversions on one or more PEs. The influence of each option should be evaluated in an order of priority until the conflict is resolved; simultaneous evaluation of two or more parameters may be required.

Preferably, the hierarchy of conflict resolution prioritizes in descending order as follows: conditional access, mode functions, mapping features and PE order. Preferably, the DPM controls are prioritized in descending order as follows: Map, Pass, Drop, and unreferenced content. Other prioritizations may be utilized and include fewer or more rules depending on the implementation. The conflict resolution hierarchy ensures that a stable PE is defined as the filter source for each output program and its constituent elementary streams and, therefore, reduces the likelihood of algorithmic switches from a source PE resulting in output transients that adversely affect downstream equipment.

In the absence of packet copy or PID remapping, the applicable DPM control must be determined for application, and then how PSI regeneration follows the resultant DPM control. Resolution hierarchy depends upon several factors (e.g. DPM control, conditional access status, PE ordering etc.) and allows different rules to apply to the DPM priority control and the ordering of PSI regeneration. For example, packet copy, PID remapping, and PSI remapping represent one hierarchical set at the program level that imposes different limitations on DPM. This is the point of the S/R examples that follow (FIGS. 2-5). In order to determine which elementary services (and PIDs) are used, the source or filtering PE must be first determined. Even something as simple as the dropping of an elementary service requires an evaluation of the rules against all currently assigned programs on the active PEs. For example, an ES may not be dropped if some other program requires it. At most, the ES reference may be removed from the requesting PE's output PMT. This is an example of conflict resolution at the PID level.

Figure 1:
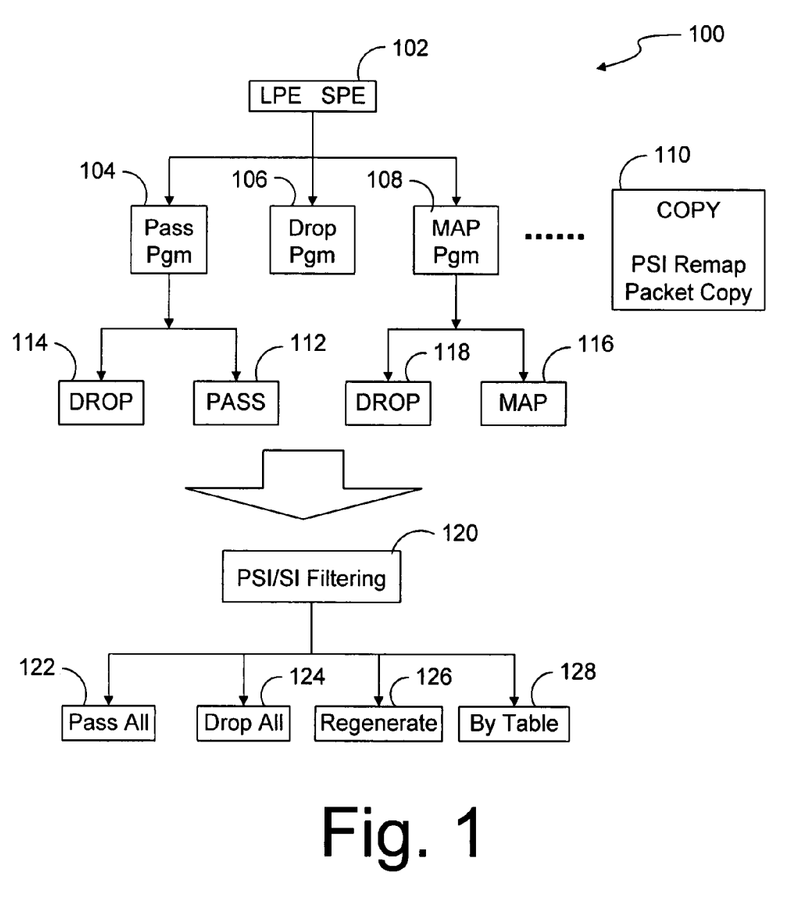
FIG. 1 illustrates a chart of various electronic services of what may happen at the PID level and what may happen to the program specific information (PSI) according to the present invention.

FIG. 1 illustrates one embodiment of the control overview of a DPM system 100 of the present invention. In block 102, the LPEs and SPEs are processed at the program level which included programs to implement at least the three control modes of Pass, Drop and Map as shown in blocks 104, 106, 108, respectively. Also, in block 110, all or a portion of an elementary stream may be copied to yield one or more copies of the original stream, or portions thereof, each with a unique PID. The PIDS of the transport stream are filtered by the Pass, Drop or Map controls.

From the Drop control 106, one or more of the elementary streams of the transport stream may be dropped, as explained above. From the Pass control 104, the constituent elementary services may be either passed without modification to the output as shown in block 112 or dropped as shown in block 114. From the Map control 108, the constituent elementary services identified within the input PMT may be either remapped as shown in block 116 and as explained in more detail below or dropped from the output as shown in block 118. Still referring to FIG. 1, once all the PIDS have been dealt with, then the PSI/SI is filtered as shown in block 120. The options available to implement upon the PSI/SI include Pass All, Drop All, Regenerate, and By Table as shown in blocks 122, 124, 126 and 128. In the event of the unreferenced content, the content is not filtered. The unreferenced content is either completely passed or completely dropped.

Figure 2:
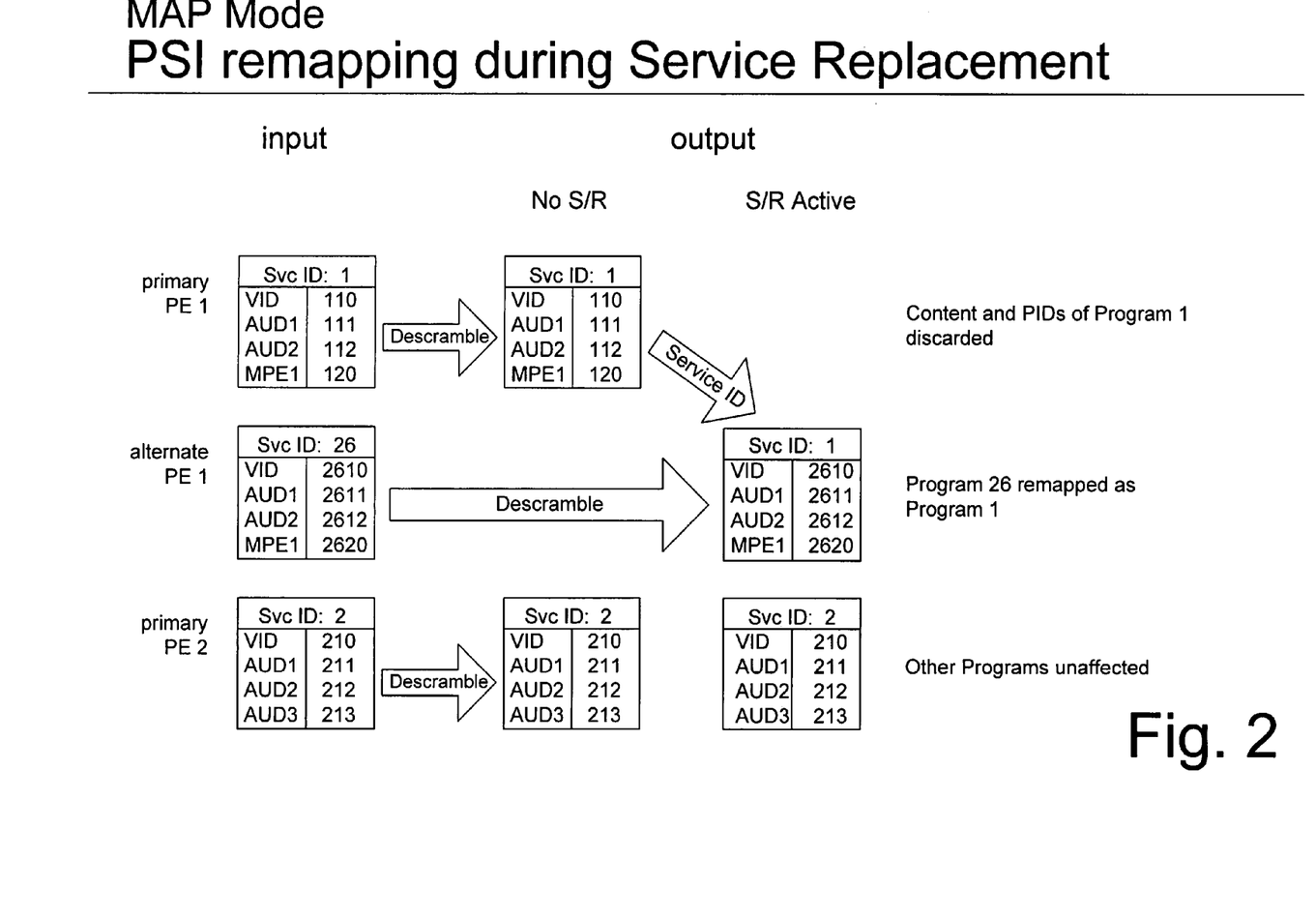
FIG. 2 illustrates PSI remapping during service replacement (S/R).

FIGS. 2-10 illustrate various remapping examples which implement the present invention. FIG. 2 illustrates, in particular, PSI remapping during service replacement. In FIG. 2, at the input there are primary PEs 1 and 2, with an alternate PE 1. Primary PEs 1 and 2 include service IDs 1 and 2, respectively. Alternate PE 1 includes a service ID of 26. The input program map tables (PMTs) of primary PE 1 and alternate PE 1 include one video, two audio, and one Multi Protocol Encapsulation (MPE) elementary streams. Primary PE 2, on the other hand, includes one video and three audio elementary streams.

During the S/R transition from primary (channel 1) to alternate (channel 26) on PE 1, the services of channel 26 replace those of channel 1. Employing PSI remapping, only the primary service ID, 1, is retained and transferred to the PMT of the alternate program on PE 1. No PIDs have been modified. Therefore, the output PMT of service ID 1 now has the PIDs which had corresponded to the PIDs of input PMT alternate PE 1. Thus, program 26 has been remapped as program 1. Other programs on other PEs, such as PE 2 remain unchanged.

Figure 3:
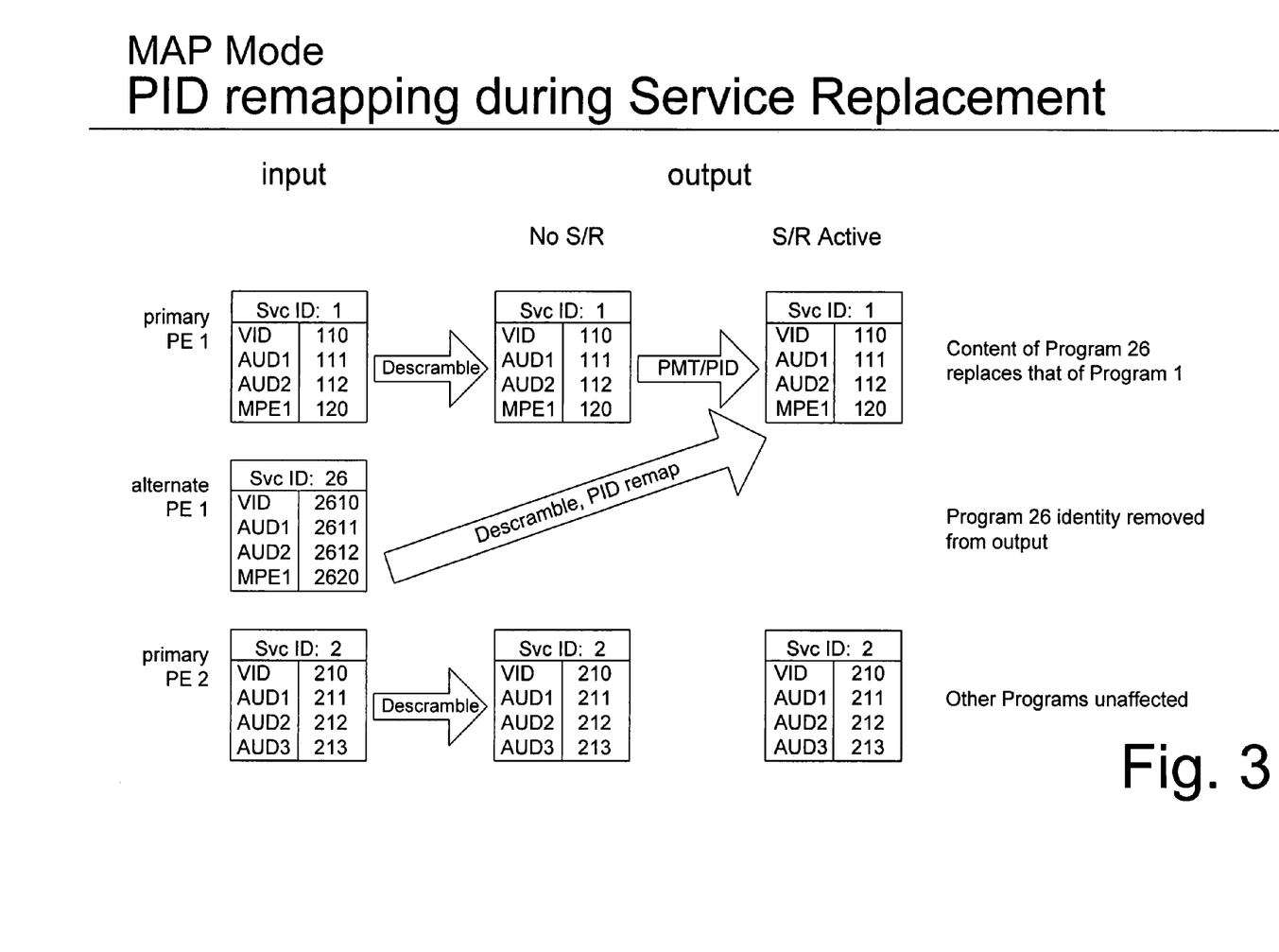
FIG. 3 illustrates PID remapping during S/R.

FIG. 3 illustrates PID remapping during S/R. As in the previous example, at the input there are primary PEs 1 and 2, with an alternate pending on PE 1. Primary PEs 1 and 2 are assigned service IDs 1 and 2, respectively. The alternate program for PE 1 includes a service ID of 26. However, in this example, the content of the alternate, program 26, replaces the content of the primary, program 1 through the PID remapping function. The original PMT of program 1 is retained but the services of program 26 are remapped to retain the PID identities of program 1. The PMT of program 26 is discarded. In other words, the identity of program 26 has been removed from the output. Primary program 2 is again unaffected.

Figure 4:
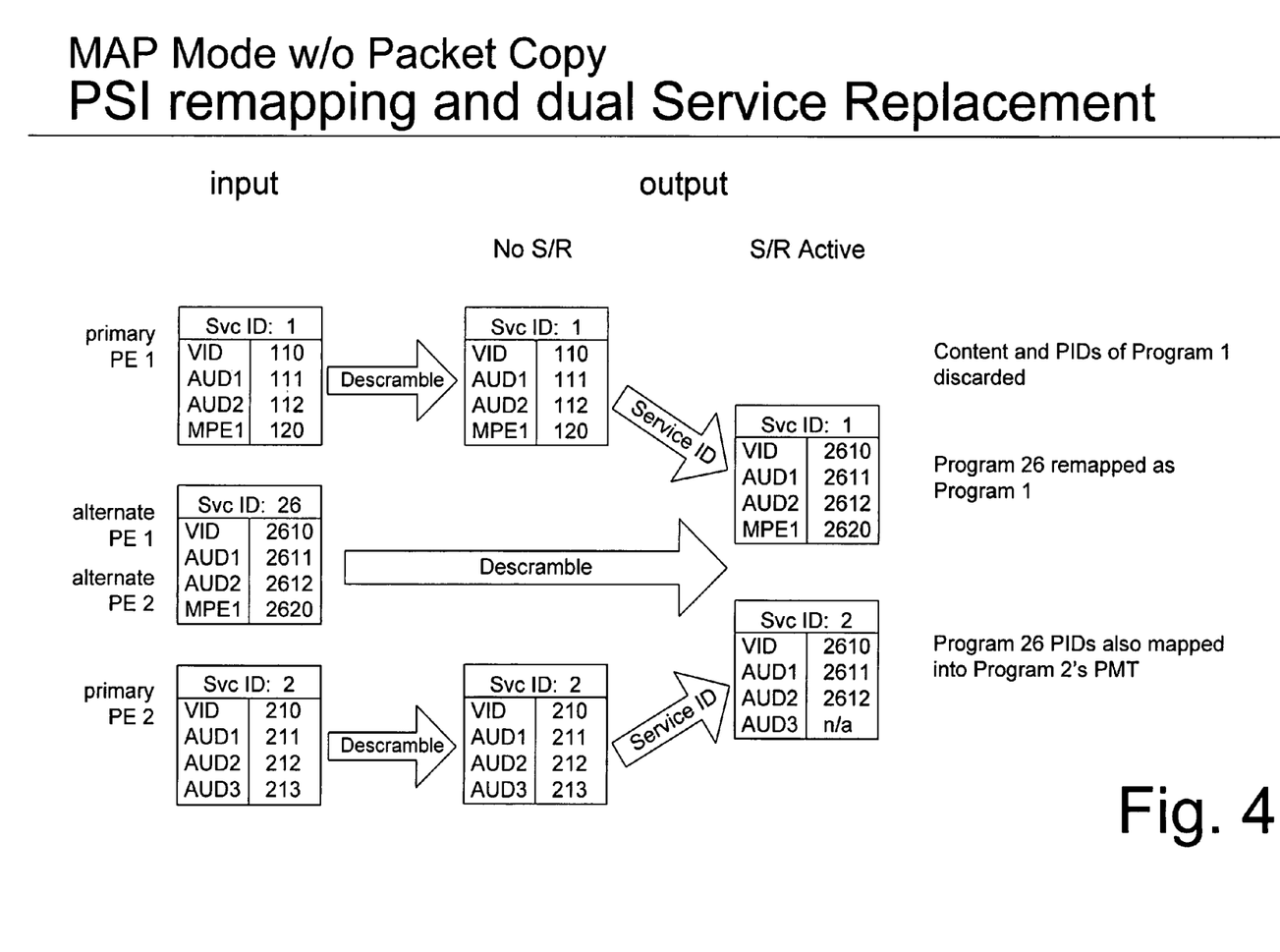
FIG. 4 illustrates PSI remapping and dual S/R.

FIG. 4 illustrates PSI remapping and dual S/R to the same alternate program. At the input there are primary PEs 1 and 2, with the same alternate program pending. PEs l and 2 include service IDs 1 and 2, respectively and have a common alternate, service 26. The primary PMT on PE 1 and the alternate PMT include one video, two audio, and one MPE elementary streams. The primary on PE 2, on the other hand, includes one video and three audio elementary streams.

In this example, the content and PIDs of program 1 are discarded in order to filter program 26 in place of program 1. Program 26's PIDs are mapped into program 1's output PMT. The replaced output of program 1 continues to look like program 1 despite having its original content and PIDs discarded. Also, because program 26 is the alternate to primary program 2, Program 26's PIDs are mapped into program 2's output PMT and the replaced output of program 2 continues to look like program 2 despite having its original content and PIDs discarded. However, because program 26 only has two audio elementary streams in the input, the remapped program 2 can only have two audio elementary streams at the output. In this case, the reference to the third audio service is lost because the alternate's PID assignments are retained under PSI remapping. A PID remapping exercise would have permitted the output PMT of remapped program 2 to continue to make reference to the missing elementary stream without discarding it.

Figure 5:
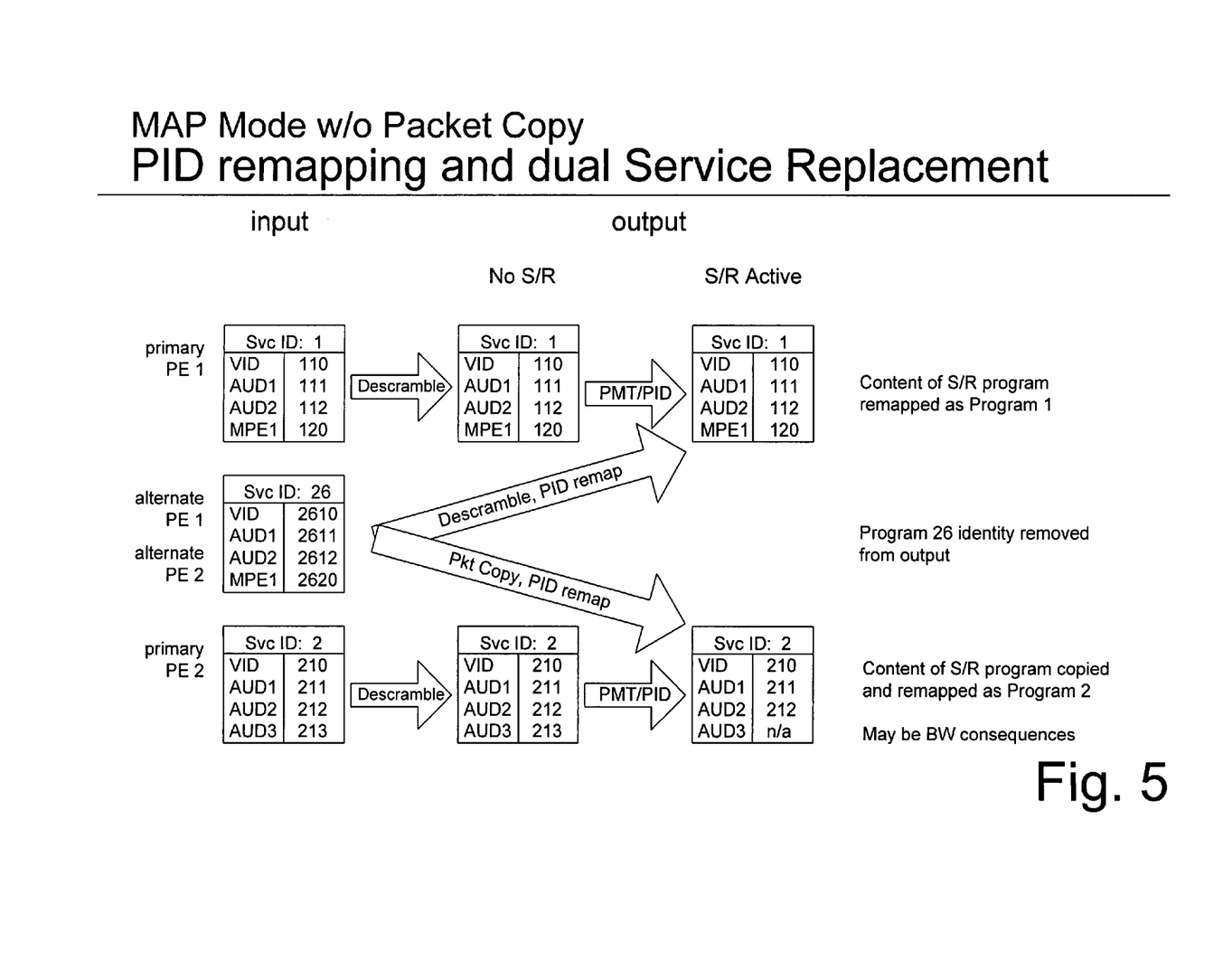
FIG. 5 illustrates PID remapping and dual S/R.

FIG. 5 illustrates in a MAP mode with packet copy an implementation of PID remapping and dual S/R. As in FIG. 4, at the input there are primary PEs 1 and 2, with a common pending alternate program. PEs 1 and 2 include service IDs 1 and 2, respectively and have a common alternate, service 26. The primary PMT on PE 1 and the alternate PMT include one video, two audio, and one MPE elementary streams. The primary on PE 2, on the other hand, includes one video and three audio elementary streams.

The content and PIDs of program 1 are discarded in order to filter program 26 in place of program 1. A PID remap then maps the replaced content of the output PMT of program 1 with the retained the PIDs of the original content of program 1. Also, the input PMT of program 26 is discarded. In other words, the identity of program 26 has been removed from the output of program 1. In this example, which is distinguishable from the example of FIG. 3, Primary program 2 is affected. In FIG. 5, because the program 26 is the alternate to both programs 1 and 2 and it has already been remapped to program 1, the content of program 26 is copied and then remapped as program 2. Note that the PID for audio 3 is retained within the PMT of service ID 2 on PE 2 even though there is no content currently available. There may be bandwidth consequences as a result of the duplication of the content of program 26.

Figure 6:
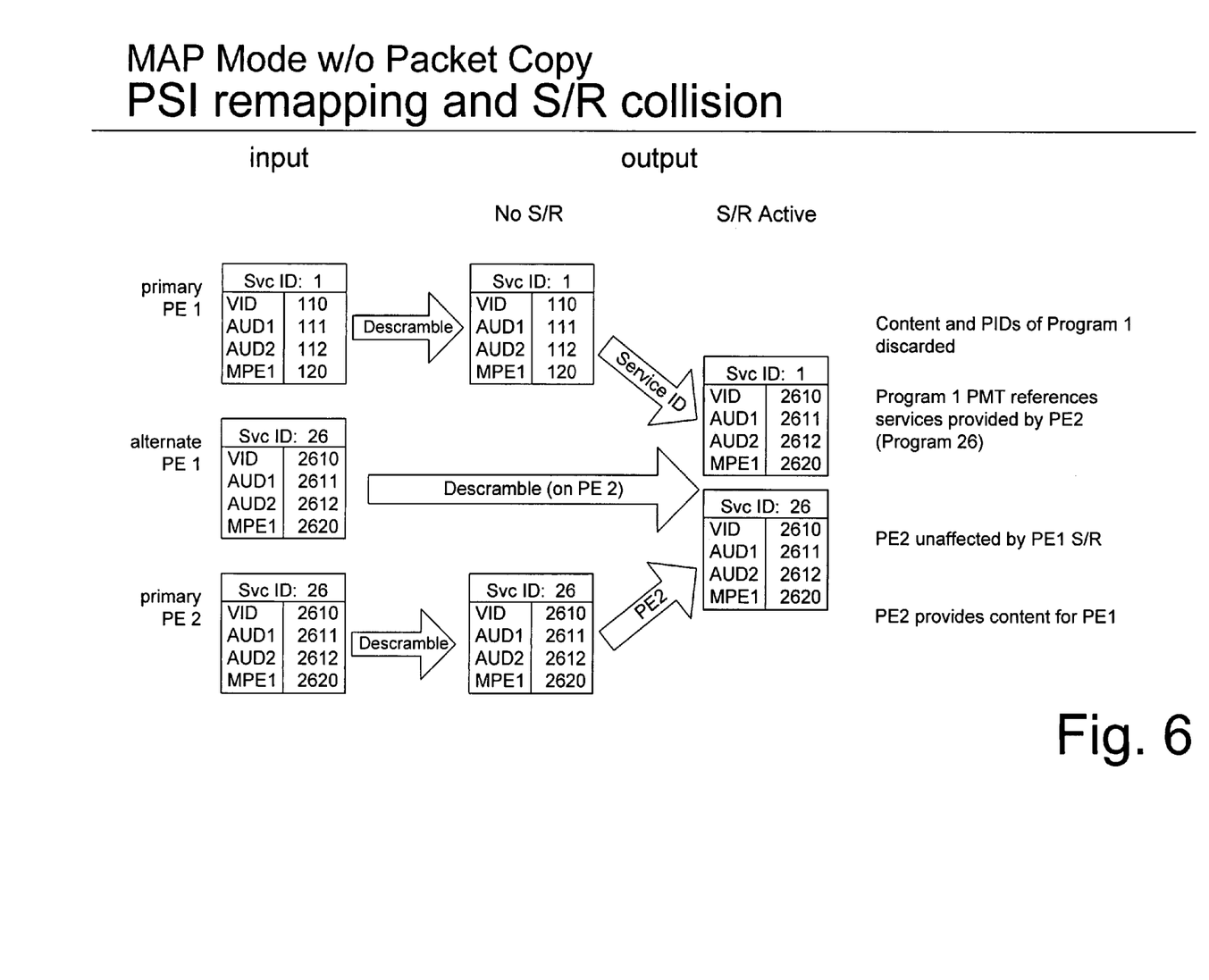
FIG. 6 illustrates PSI remapping and S/R collision.

FIG. 6 illustrates in a MAP mode without packet copy an implementation of PSI remapping and S/R collision. At the input there are primary PEs 1 and 2, with a pending alternate for PE 1. PEs 1 and 2 include service IDs 1 and 26, respectively. The alternate for PE 1 includes a service ID of 26. The primary PMT on PE 1, PE2, and the alternate PMT include one video, two audio, and one MPE elementary streams. However, the alternate program for PE 1 and the primary on PE 2 are the same, resulting in what is commonly referred to as a collision following the S/R.

The content and PIDs of program 1 on PE 1 are discarded in favor of program 26 as provided by PE 2. The regenerated PMT of Program 1 references the services provided by PE 2 having a service ID of 26. PE 2 remains unaffected by the transition. More importantly, downstream devices dependent on service ID 26 perceive no interruption of service.

Figure 7:
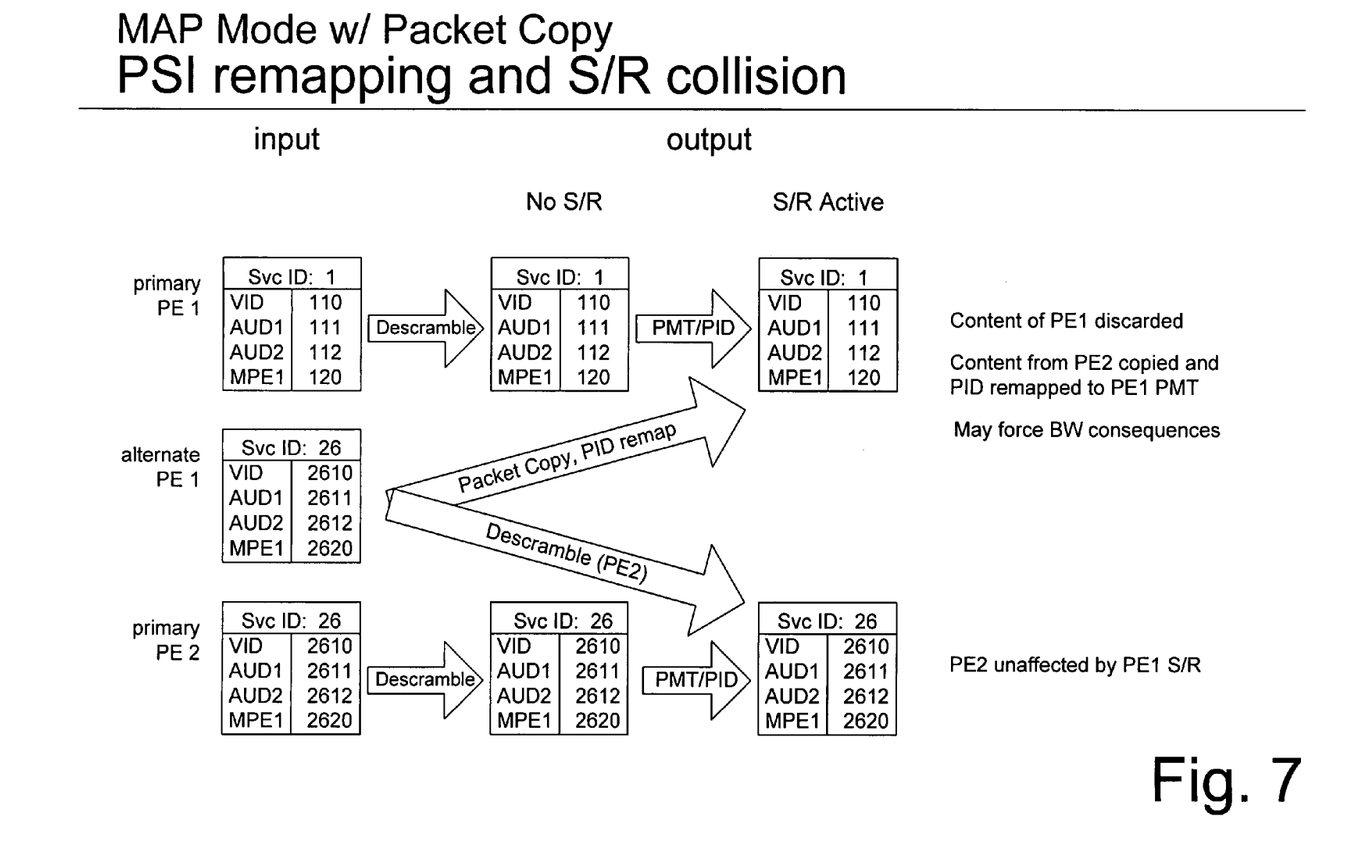
FIG. 7 illustrates PID remapping and S/R collision.

FIG. 7 illustrates in a MAP mode with packet copy an implementation of PID remapping and S/R collision. As in FIG. 6, at the input there are primary PEs 1 and 2, with a pending alternate for PE 1. Primary PEs 1 and 2 include service IDs 1 and 26, respectively. The alternate for PE 1 includes a service ID of 26. The primary PMT on PE 1, PE2, and the alternate PMT include one video, two audio, and one MPE elementary streams. However, there is a collision as a result of the common program shared by the alternate on PE 1 and the primary on PE 2.

In this example, the collision upon S/R can be resolved by copying the elementary stream packets from PE 2 and restamping them with the PIDs referenced in the PMT on PE 1. PE 2 remains unaffected by the service replacement of PE. Again, downstream devices dependent on service ID 26 perceive no interruption of service. However, there may be bandwidth consequences as a result of implementing this example.

Figure 8:
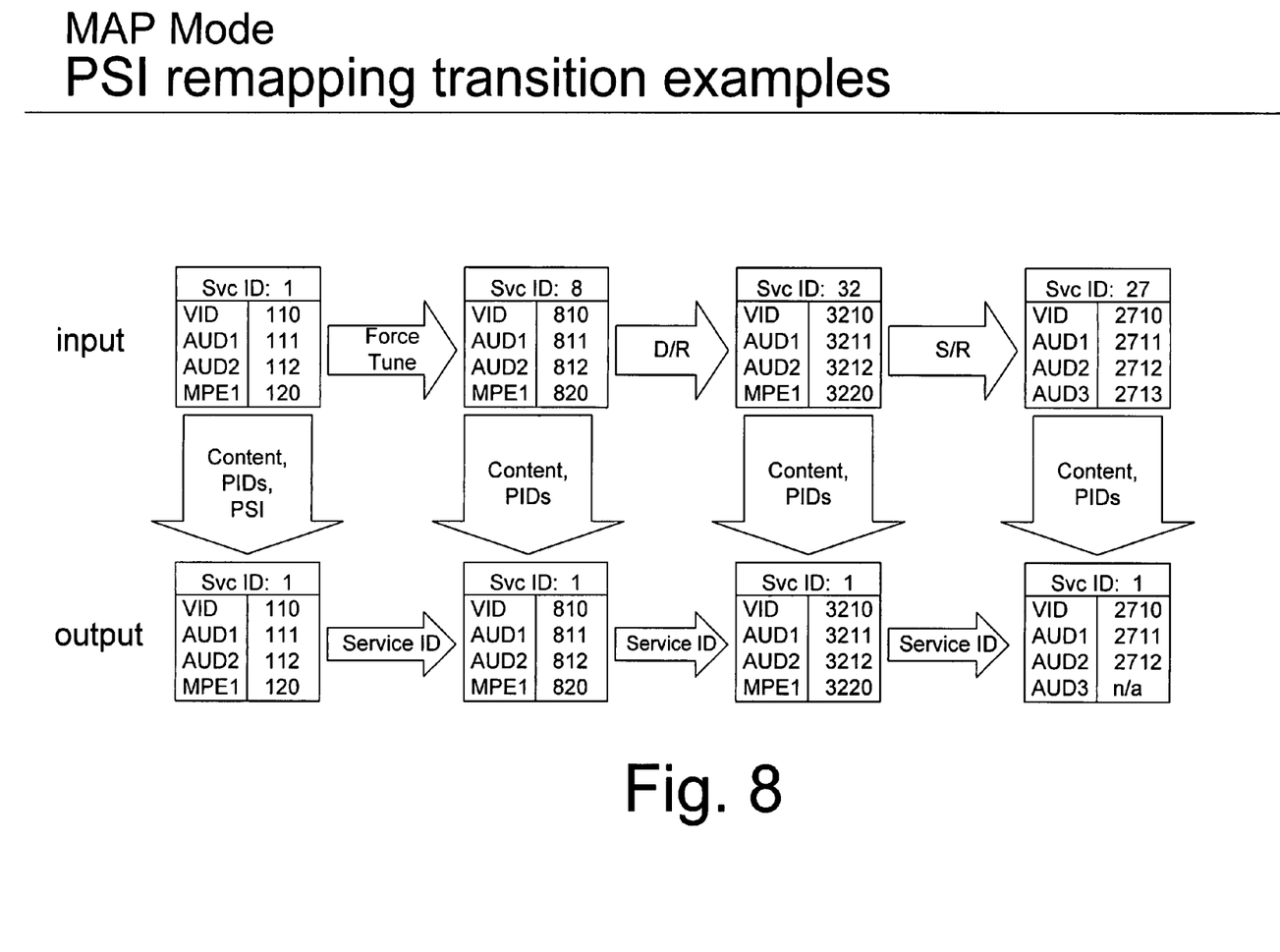
FIG. 8 illustrates PSI remapping transition examples.

FIG. 8 illustrates PSI remapping examples where a PMT, on the input side, having a service ID of 1, is remapped as a result of a force tune, disaster recovery, and a S/R. In each case, the subsequent PMT identifying service ID 1 on the output side along with the filtered PIDs is also depicted. The first output of the PMT with the service ID of 1 is the same without any PSI remapping. However, in the force tune, to the PMT having a service ID of 8 and different PIDs, PSI remapping results in a modified output PMT identifying service ID 1 but retains the content and PIDS of its input PMT.

In the disaster recovery example of PSI remapping, the input PMT identifying service ID 32 results in a modified output PMT again identifying service ID 1 but having the content and PIDs of its input PMT. In the S/R example of PSI remapping, the input PMT identifying service ID 27 results in a modified PMT again identifying service ID 1 but having the content and PIDs of its input PMT. However, in this example of PSI remapping in S/R as depicted in FIG. 8, the output PMT is looking for MPE1 but does not receive it. The PMT identifying service ID 27 has AUD3 shown as being part of the transport stream, but AUD3 will not appear in the output PMT since it was not previously specified when the original output services were selected. Neither will the MPE service appear in the output PMT because an equivalent service is not available on the input PMT.

Figure 9:
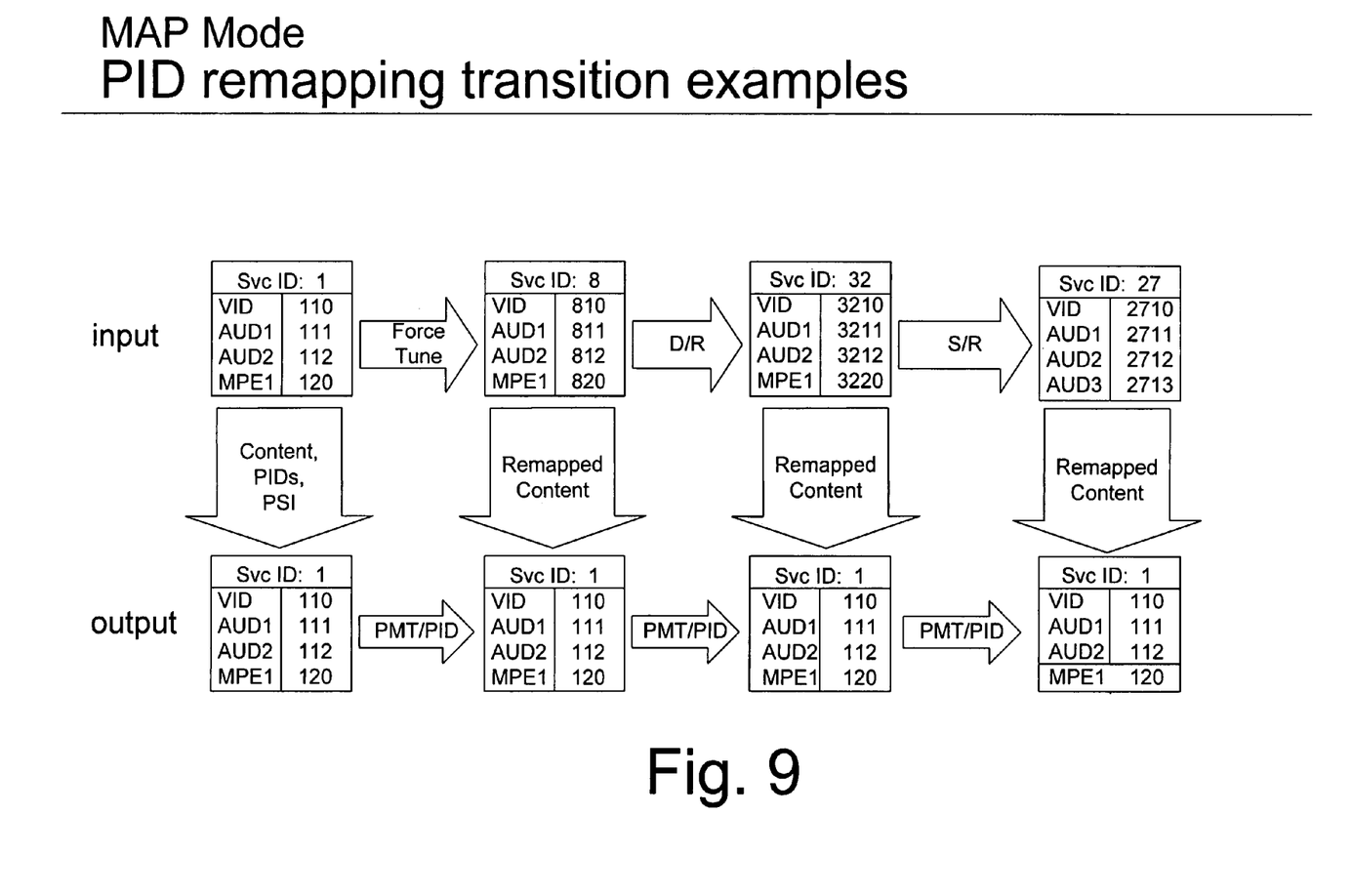
FIG. 9 illustrates PID remapping transition examples.

FIG. 9 illustrates PID remapping examples where the PIDS of a PMT, on the input side, having a service ID of 1, are remapped as a result of a force tune, disaster recovery, and a S/R. In each case, the subsequent PMT identifying service ID 1 remains the same. The first output of the PMT with the service ID of 1 is the same without any PID remapping. However, in the force tune, to the PMT having a service ID of 8 and different PIDs, PID remapping results in a modified output PMT identifying service ID 1 having remapped content. In the disaster recovery and S/R examples, where the input PMT is modified to identify different service IDs and different PIDS, the resulting output PMT includes remapped content and PIDS where the remapped PIDS correspond to the PIDS of the original input PMT. However, in the S/R example of FIG. 9, the input PMT references an elementary stream of AUD3. The resulting output PMT does not reference AUD3 because the original output selection made no such reference. Instead, the output PMT retains the reference to MPE1 without any content being present.

Figure 10:
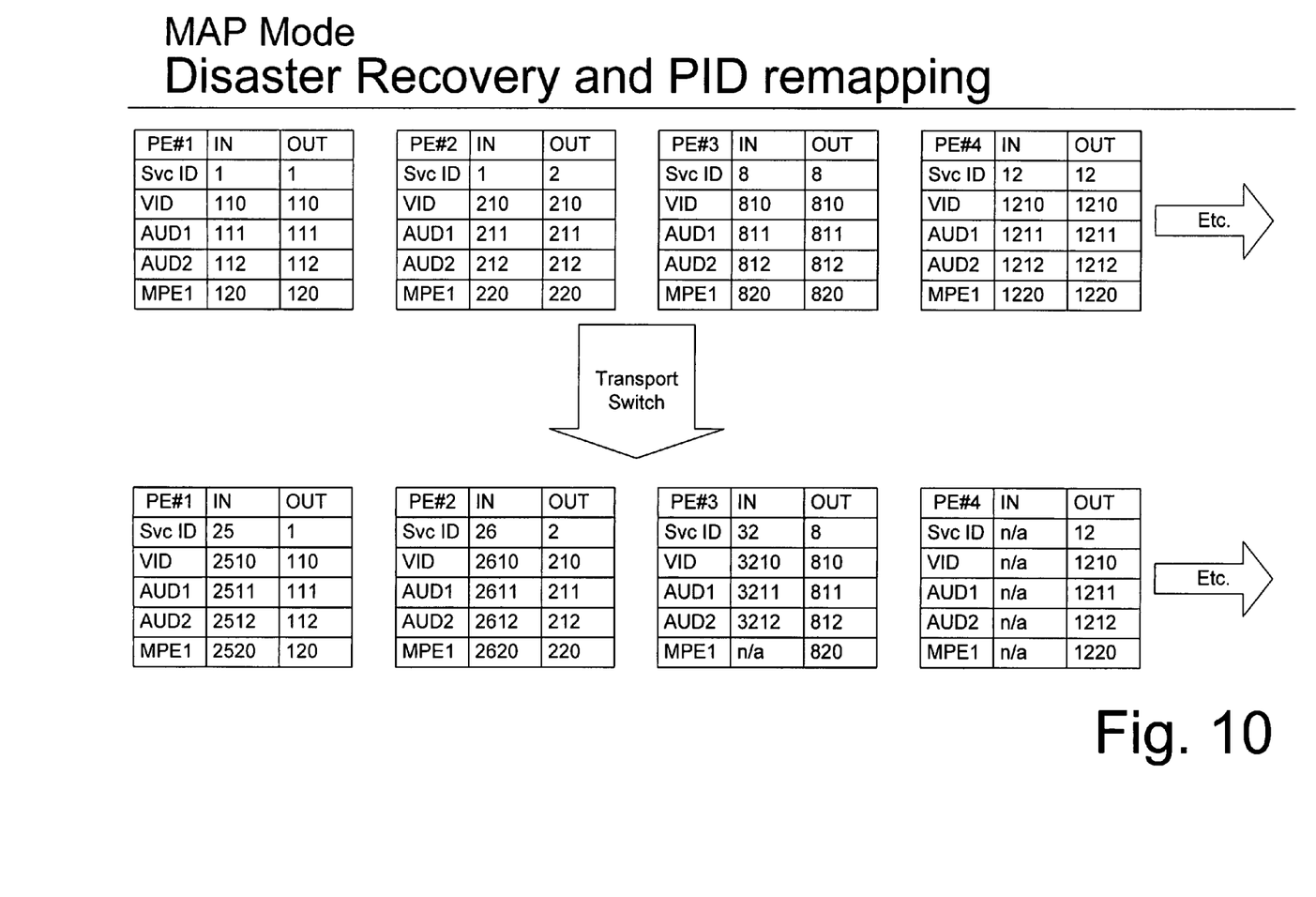
FIG. 10 illustrates disaster recovery and PID remapping.

FIG. 10 illustrates a disaster recovery example where four different PEs are switched to four other PEs. For example, where one satellite fails, a transport stream from an alternate satellite is provided. In each case, the PIDS of the outputs remain the same as the PIDS of their corresponding inputs. In the output PMT of PE 3, reference is made to a MPE stream that is not present. The output PMT of PE 4 is retained even though no replacement source program is provided. A replacement program is one that is substituted in place of another on a PE. In this case, the replacement is provided by the disaster recovery mechanism but could equally be a manual change, a force tune, or a service replacement alternate. Other means of replacement are also possible. The replacement of a program may be initiated at the uplink or through local action.

Figure 11:
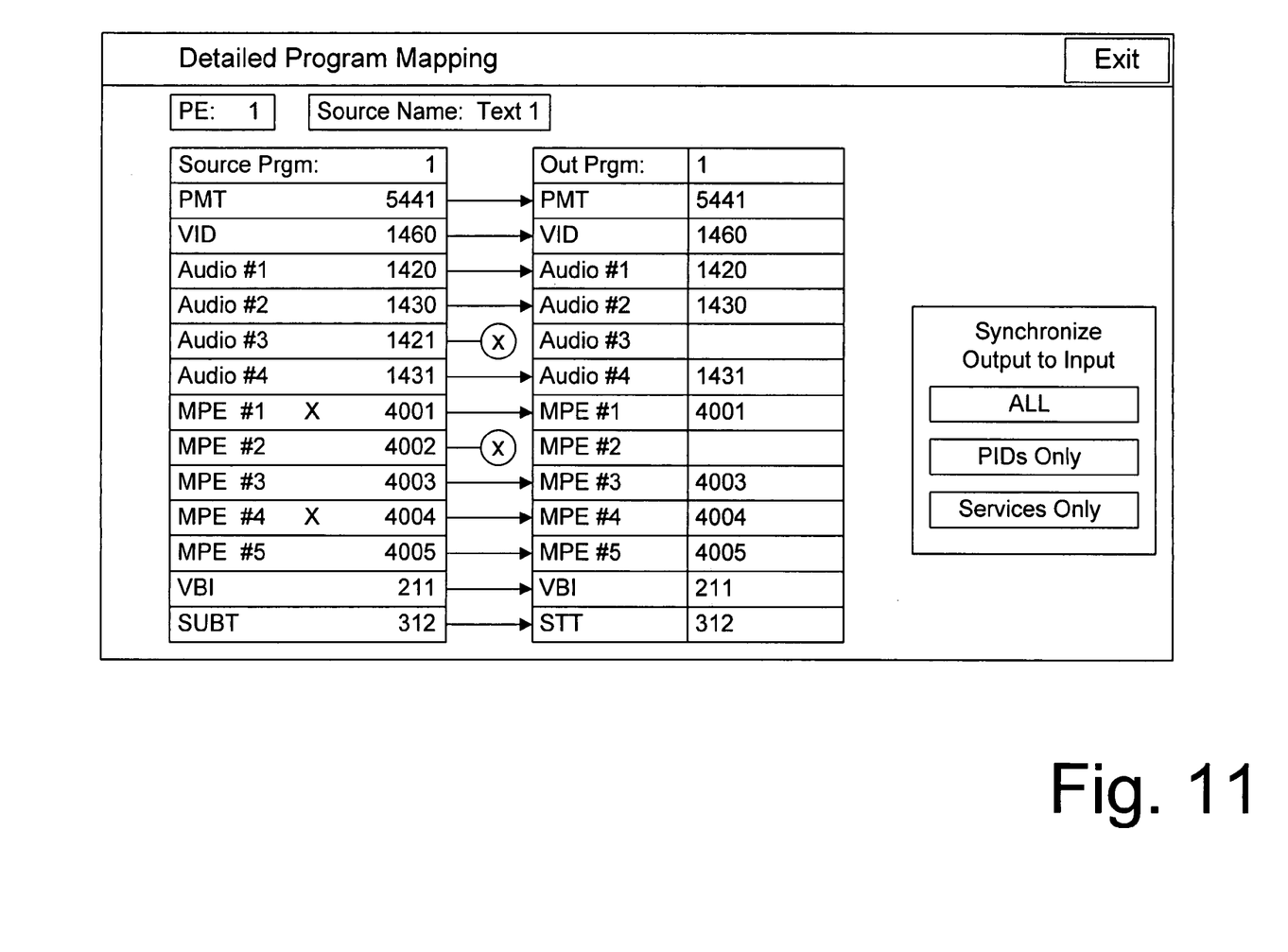
FIG. 11 illustrates a menu for editing program entries.

FIG. 11 depicts a menu of edit program entry details for MAP mode according to one embodiment of the present invention. Each program of the transport stream may be edited is a similar manner. In FIG. 11, PE 1 includes a source program having an input PMT having reference number 5441 and an output program having an output PMT also having reference number 5441. The output program number, output PMT PID, and/or output services may be changed. Each of these may be manually changed or synchronized automatically. Synchronization normalizes the output services and/or their respective PIDs to conditions present on input and/or stored templates. Any remapped PIDs may be depicted in the menu by comparing the PIDS of the input and output of a particular elementary stream. If the PIDS do not match, the PIDs have been remapped MAP mode guarantees that any output program and service references will be maintained indefinitely regardless of any input change on the same PE.

This detailed program mapping in FIG. 11 depicts audio 3 and MPE 2 dropped from the output as indicted by the circled "X" between the input and output PMTs. These two services would not be restored regardless of any changes on the input side. Only an explicit edit or resynchronization can restore a previously blocked service. Any subsequent change on the input side that adds services such as MPE 6 would not result in those same services appearing on the output side.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method for manipulating programs within one or more transport streams, the method comprising the steps of:
    assigning a first program to a first program entry (PE 1), the first program having a first input program map table (PMT 1) identifying a first service ID and a plurality of first packet identifiers (PIDs) associated with a first plurality of elementary streams of the first program, the first service ID identifying the first program;
    assigning a second program to a second program entry (PE 2), the second program having a second input program map table (PMT 2) identifying a second service ID and a plurality of second PIDs associated with a second plurality of elementary streams of the second program, the second service ID identifying the second program;
    providing an alternate program to the first program, the alternate program having a third input program map table (PMT 3) identifying a third service ID and a plurality of third PIDs associated with a third plurality of elementary streams of the alternate program, the third service ID identifying the third program;
    discarding the first plurality of elementary streams of the first program and the plurality of first PIDs associated with the first program; and
    remapping the alternate program such that the alternate program includes an output PMT identifying the first service ID of the first program and having the plurality of third PIDs referencing the third plurality of elementary streams of the alternate program, wherein the first and third service identifiers (IDS) are different service IDS.

2. The method of claim 1 wherein the second program assigned to the PE 2 is unaffected by the alternate program being remapped to be identified by the first service ID.

3. The method of claim 1 further comprising the steps of:
    providing a second alternate program to the second program, the second alternate program also having the PMT 3 identifying the third service ID and the plurality of third PIDs associated with the third plurality of elementary streams;
    discarding the second plurality of elementary streams of the second program and the plurality of second PIDs associated with the second program; and
    remapping the second alternate program such that the second alternate program includes an output PMT identifying the second service ID of the second program and having the plurality of third PIDs referencing the third plurality of elementary streams of the second alternate program.

4. A method for manipulating programs within one or more transport streams, the method comprising the steps of:
    assigning a first program to a first program entry (PE 1), the first program having a first input program map table (PMT 1) identifying a first service ID and a plurality of first packet identifiers (PIDs) associated with a first plurality of elementary streams of the first program, the first service ID identifying the first program;

assigning a second program to a second program entry (PE 2), the second program having a second input program map table (PMT 2) identifying a second service ID and a plurality of second PIDs associated with a second plurality of elementary streams of the second program, the second service ID identifying the second program;

providing an alternate program to the first program, the alternate program having a third input program map table (PMT 3) identifying a third service ID and a plurality of third PIDs associated with a third plurality of elementary streams of the alternate program, the third service ID identifying the third program;

discarding the first plurality of elementary streams of the first program and the plurality of first PIDs associated with the first program; and remapping the third plurality of elementary streams of the alternate program to an output PMT identifying the first service ID of the first program assigned to the PE 1 and the plurality of first PIDs of the first program to have the plurality of third PIDs of the alternate program in order to reference the third plurality of elementary streams such that the output PMT identifying the first service ID is associated with the alternate program, wherein the first and third service identifiers (IDS) are different service IDS.

5. The method of claim 4 further comprising the steps of:
providing a second alternate program to the first program, the second alternative program also having the PMT 3 identifying the third service ID and the plurality of third PIDs associated with the third plurality of elementary streams;

discarding the second plurality of elementary streams of the second program and the plurality of seconds PIDs associated with the second program; and copying the third plurality of elementary streams and remapping the copied third plurality of elementary streams to an output PMT identifying the service ID of the second program assigned to PE 2 and the plurality of second PIDs to reference the copied third plurality of elementary streams.

6. A method to automatically resolve output mapping collisions between packet identifiers (PIDs) of two or more programs following an input program change, the method comprising the steps of:
assigning a first program to a first program entry (PE 1), the first program having a first input program map table (PMT 1) identifying a first service ID and a plurality of first PIDs associated with a first plurality of elementary streams of the first program, the first service ID identifying the first program;

assigning a second program to a second program entry (PE 2), the second program having a second input program map table (PMT 2) identifying a second service ID and a plurality of second PIDs associated with a second plurality of elementary streams of the second program, the second service ID identifying the second program;

replacing the first program with a replacement program, the replacement program having a third input program map table (PMT 3) identifying a third service ID and a third plurality of PIDs associated with a third plurality of elementary streams of the alternate program, the second and third service identifiers (IDS) being identical and being different from the first service ID, at least a portion of the second and third plurality of PIDs being identical to create the collision, the third service ID identifying the third program;

discarding the first plurality of elementary streams of the first program and the plurality of first PIDs associated with the first program;

remapping the replacement program such that the replacement program includes an output PMT identifying the first service ID of the first program and having the plurality of third PIDs referencing the third plurality of elementary streams of the alternate program; and the second program having an output PMT retaining the second service ID and the second plurality of second PIDs associated with the second plurality of elementary streams, wherein the collision between the PIDs of the second program and the alternate program is reconciled.

7. A method to automatically resolve output mapping collisions between packet identifiers (PIDs) of two or more programs following an input program change, the method comprising the steps of:
assigning a first program to a first program entry (PE 1), the first program having a first input program map table (PMT 1) identifying a first service ID and a plurality of first PIDs associated with a first plurality of elementary streams of the first program, the first service ID identifying the first program;

assigning a second program to a second program entry (PE 2), the second program having a second input program map table (PMT 2) identifying a second service ID and a plurality of second PIDs associated with a second plurality of elementary streams of the second program, the second service ID identifying the second program;

providing an alternate program to the first program, the alternate program having a third input program map table (PMT 3) identifying a third service ID and a third plurality of PIDs associated with a third plurality of elementary streams of the alternate program, the second and third service identifiers (IDS) being identical and at least a portion of the second and third plurality of PIDs being identical to create the collision, the third service ID identifying the alternate program;

discarding the first plurality of elementary streams of the first program; and copying the third plurality of elementary streams of the alternate program and remapping the copied third plurality of elementary streams to an output PMT identifying the service ID of the first program assigned to PE 1 and the plurality of first PIDs to reference the copies third plurality of elementary streams.

8. A method for manipulating programs within one or more transport streams, the method comprising the steps of:
assigning a first program to a program entry, the first program having an input program map table (PMT) identifying a first service ID and a plurality of first packet identifiers (PIDs) associated with a first plurality of elementary streams of the first program, the first service ID identifying the first program;

force tuning the program entry from the assigned first program to a second program with a second service ID identified by the input PMT and a plurality of second PIDs associated with a second plurality of elementary streams, the second service ID identifying the second program; and remapping the input PMT to generate an output PMT that identifies the first service ID of the first program and the plurality of second PIDs associated with the second plurality of elementary streams of the second program;

outputting the second program based on the output PMT, such that the second program is output with the first service ID and the second plurality of PIDs, to provide the second plurality of elementary streams associated with the second plurality of PIDs, wherein the first service ID and the second service ID identify different programs.

9. A method of manipulating services within one or more transport streams comprising the steps of:
assigning a first program to a program entry, the first program having an input program map table (PMT) identifying a first service ID and a plurality of first packet identifiers (PIDs) associated with a first plurality of elementary streams of the first program, the first service ID identifying the first program;
losing a link to the transport stream having the first program and recovering a second program on a second transport stream assigned to the program entry;
inputting a second program of a second transport stream assigned to the program entry, the second program having an input program map table (PMT) identifying a second service ID and a plurality of second PIDs associated with a second plurality of elementary streams of the second program, the second service ID identifying the second program; and
outputting the second program having an output PMT identifying the first service ID and the plurality of second PIDs associated with the second plurality of elementary streams, wherein the first and second service identifiers (IDS) are different service IDS.

10. A method of manipulating services within one or more transport streams comprising the steps of:
inputting a first program assigned to a program entry, the first program having an input program map table (PMT) identifying a first service ID and a plurality of first packet identifiers (PIDs) associated with a first plurality of elementary streams of the first program, the first service ID identifying the first program;
inputting an alternate program assigned to a second program entry, the alternate program having an input program map table (PMT) identifying a second service ID and a plurality of second PIDs associated with a second plurality of elementary streams of the alternate program, the second service ID identifying the alternate program; and
outputting the alternate program having an output PMT identifying the first service ID and the plurality of second PIDs associated with the second plurality of elementary streams, wherein the first and second service identifiers (IDS) are different service IDS.

11. The method of claim 10 further comprising the step of referencing in the output PMT at least one of the elementary streams of the alternate program which is not present.

12. A method of manipulating services within one or more transport streams comprising the steps of:
inputting a first program assigned to a program entry, the first program having an input program map table (PMT) identifying a first service ID and a plurality of first packet identifiers (PIDs) associated with a first plurality of elementary streams of the first program, the first service ID identifying the first program;
force tuning the program entry to a second program with a second service ID identified by the input PMT and a plurality of second PIDs associated with a second plurality of elementary streams, the second service ID identifying the second program; and
outputting the second program associated with the second plurality of elementary streams having an output PMT identifying the first service ID and the plurality of first PIDs, wherein the first and second service identifiers (IDS) are different service IDS.

13. A method of manipulating services within one or more transport streams comprising the steps of:
inputting a first program assigned to a program entry, the first program having an input program map table (PMT) identifying a first service ID and a plurality of first packet identifiers (PIDs) associated with a first plurality of elementary streams of the first program, the first service ID identifying the first program;
losing a link to the transport stream having the first program and recovering a second program on a second transport stream assigned to the program entry;
inputting a second program of a second transport stream assigned to the program entry, the second program having an input program map table (PMT) identifying a second service ID and a plurality of second PIDs associated with a second plurality of elementary streams of second program, the second service ID identifying the second program; and
outputting the second program associated with the second plurality of elementary streams having an output PMT identifying the first service ID and the plurality of first PIDs, wherein the first and second service identifiers (IDS) are different service IDS.

14. A method of mixing services within one or more transport streams comprising the steps of:
inputting a first program assigned to a program entry, the first program having an input program map table (PMT) identifying a first service ID and a plurality of first packet identifiers (PIDs) associated with a first plurality of elementary streams of the first program, the first service ID identifying the first program;
inputting an alternate program assigned to a second program entry, the alternate program having an input program map table (PMT) identifying a second service ID and a plurality of second PIDs associated with a second plurality of elementary streams of the alternate program, the second service ID identifying the alternate program; and
outputting the alternate program associated with the second plurality of elementary streams having an output PMT identifying the first service ID and the plurality of first PIDs.

15. The method of claim 14 further comprising the step of referencing in the output PMT at least one of the elementary streams of the first program which is not present.

16. A method for manipulating programs within one or more transport streams, the method comprising the steps of:
inputting a first program assigned to a first program entry, the first program having a first input program map table (PMT) identifying a first service ID and a plurality of first packet identifiers (PIDs) associated with a first plurality of elementary streams of the first program and the first program also having a first output PMT identifying the first service ID and the plurality of first PIDs associated with the first plurality of elementary streams of the first program, the first service ID identifying the first program;
modifying the first program entry to select another service ID;
remapping the output PMT to reference another plurality of PIDs associated with another plurality of elementary streams; and retaining the first service ID as part of the output PMT of the first program assigned to the first program entry.

17. The method of claim 16 further comprising the steps of:
inputting a second program assigned to a second program entry, the second program having a second PMT identifying a second service ID and a second plurality of PIDs associated with a second plurality of elementary streams of the second program and the second program also having a second output PMT identifying the second service ID and the second plurality of PIDs associated with the second plurality of elementary streams of the second program, the second service ID identifying the second program;
modifying the second program entry to select the other service ID; and
remapping the second output PMT to reference the other plurality of PIDs associated with another plurality of elementary streams.

18. A method for manipulating programs within one or more transport streams, the method comprising the steps of:
inputting a first program assigned to a first program entry, the first program having a first input program map table (PMT) identifying a first service ID and a plurality of first packet identifiers (PIDs) associated with a first plurality of elementary streams of the first program and the first program also having a first output PMT identifying the first service ID and the plurality of first PIDs associated with the first plurality of elementary streams of the first program, the first service ID identifying the first program;
modifying the first program entry to select another service ID;
remapping the output PMT to have other plurality of elementary streams; and
retaining the first service ID and the first plurality of PIDs for referencing the other plurality of elementary streams as part of the output PMT of the first program assigned to the first program entry.

19. The method of claim 18 further comprising the steps of:
inputting a second program assigned to a second program entry, the second program having a second PMT identifying a second service ID and a second plurality of PIDs associated with a second plurality of elementary streams of the second program and the second program also having a second output PMT identifying the second service ID and the second plurality of PIDs associated with the second plurality of elementary streams of the second program, the second service ID identifying the second program;
copying the second plurality of elementary streams associated with the second plurality of PIDs;
remapping the second output PMT to reference the other PIDs associated with the other plurality of elementary streams; and
retaining the second service ID as part of the second output PMT of the second program assigned to the second program entry.

20. A method for manipulating programs within one or more transport streams, the method comprising the following steps:
identifying as input at least one elementary stream within a first program of the one or more transport streams, the one elementary stream being defined as a particular type of elementary stream and associated with a service ID, the service ID identifying the first program;
identifying as input at least another elementary stream within another program of the one or more transport streams, the another elementary stream being defined as a particular type of elementary stream and associated with another service ID, the service ID identifying the another program that is different from the first program;
mapping the another elementary stream of the one or more transport streams as output based upon the type of the one elementary stream and the service ID of the one elementary stream; and
outputting the another program based on the mapping such that the output comprises the another elementary stream.

21. The method of claim 20 wherein the mapping step is free from associating the one elementary stream and the other elementary stream based on packet identifiers (PIDs).

* * * * *